Figure 1:
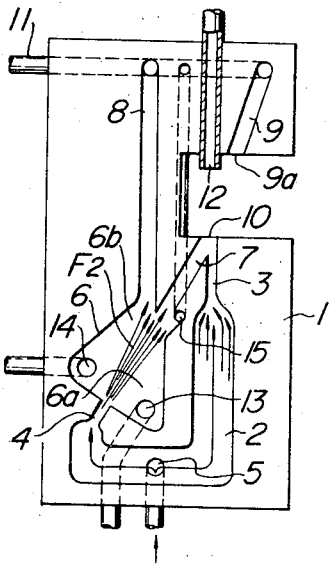

United States Patent [19]
Matsui et al.

[11] 3,718,151
[45] Feb. 27, 1973

[54] GAS CONTROLLED LIQUID PROPORTIONING FLUIDIC DEVICE

[75] Inventors: Kazuma Matsui, Toyohashi; Hideo Tsubouchi, Kariya, both of Japan

[73] Assignee: Nippondenso Kabushiki Kaisha, Aichi-ken, Japan

[22] Filed: April 30, 1971

[21] Appl. No.: 138,919

[30] Foreign Application Priority Data

May 18, 1970 Japan ................................. 45/42251
Dec. 27, 1970 Japan ................................. 45/126114

[52] U.S. Cl. ................................................. 137/823
[51] Int. Cl. ............................................ F15c 1/14
[58] Field of Search ................................. 137/81.5

[56] References Cited

UNITED STATES PATENTS

| 3,266,507 | 8/1966 | Groeber et al. ...................... 137/81.5 |
| 3,457,934 | 7/1969 | Kinner ................................... 137/81.5 |
| 3,386,710 | 6/1968 | York, Jr. ........................... 137/81.5 X |
| 3,389,894 | 6/1968 | Binder .............................. 137/81.5 X |
| 3,477,699 | 11/1969 | Drayer ............................. 137/81.5 X |

*Primary Examiner*—William R. Cline
*Attorney*—Cushman, Darby & Cushman

[57] ABSTRACT

Injection nozzle means comprising means for forming a first liquid flow and a second liquid flow which are directed so as to join with each other, said second liquid flow being passed through a deflecting chamber, means for introducing a pulse signal of compressed gas into the deflecting chamber whereby the second liquid flow is deflected into and out of confluence with the first liquid flow in accordance with the pulse signal.

6 Claims, 6 Drawing Figures

GAS CONTROLLED LIQUID PROPORTIONING FLUIDIC DEVICE

The present invention relates to an injection nozzle means in which a pulse signal of a compressed gas is converted to a pulse signal of a flow of a liquid having substantially low surface tension, such as gasoline.

Hithertofore, in order to convert a pulse signal of a compressed gas into a pulse signal of a liquid flow, the pulse signal of the compressed gas is firstly converted to another physical value such as an electric signal or a mechanical displacement, and the physical value is thereafter used to control a valve for interrupting a liquid flow. However, this known system is disadvantageous in that, since the pulse signal is intermediately converted into a physical value, a higher rate of response cannot be obtained and errors in the system tend to be increased. Further, the means for converting the pulse signal into a physical value increases the cost of the entire system. Moreover, the known system has problems in its reliability and the life.

Accordingly, the present invention has an object to eliminate the aforementioned problems encountered in such conventional system.

A further object of the present invention is to provide an injection nozzle means adapted to convert a pulse signal of a low pressure compressed gas directly into a pulse signal of a flow of a liquid having substantially low surface tension, by deflecting a liquid flow by use of a compressed gas.

A further object of the present invention is to provide an injection nozzle means which has a high response speed with a high accuracy and does not require any means for intermediately converting into another physical value or any movable part, by virtue of which the nozzle means can be made very durable and reliable with a less manufacturing cost.

Figure 2A:
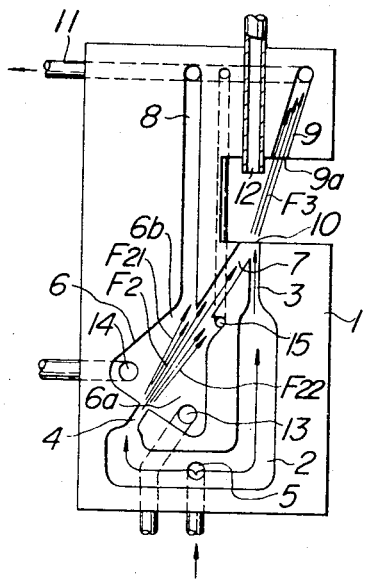
Figure 3A:
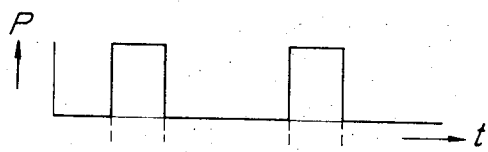
Figure 3B:
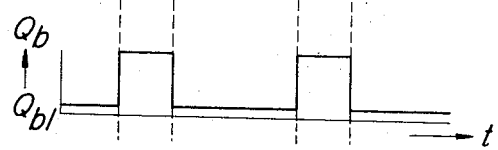
Figure 3C:
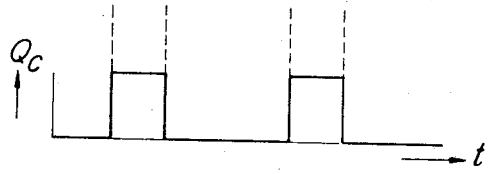

The above and other objects and features of the present invention will become apparent from the following descriptions of a preferred embodiment illustrated in the accompanying drawings, in which;

FIG. 1 is a plan view showing an injection nozzle embodying the feature of the present invention;

FIGS. 2(A) and (B) diagrammatically show the operation of the nozzle means in accordance with the present invention; and FIGS. 3(A), 3(B), and 3(C) show wave forms at various portions of the nozzle means in accordance with the present invention.

Figure 2B:
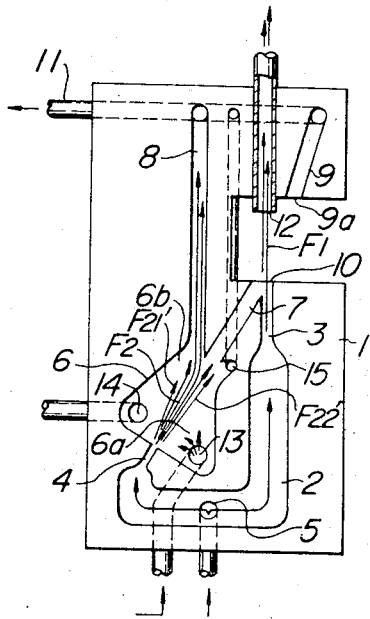

Referring now to the drawings, particularly to FIGS. 1, 2(A) and 2(B), reference numeral (1) shows a base plate, and (2) a passage formed in the base plate (1) and having nozzles (3) and (4) provided at the opposite ends thereof. Reference numeral (5) shows a liquid supply port for introducing into said passage (2) a liquid having a low surface tension, such as gasoline, and (6) shows a deflecting chamber formed in said base plate (1). The nozzle (4) is opened into the deflecting chamber (6) and the chamber (6) is provided with a branch passage (7) which is in axial alignment with the nozzle (4) and intersecting at an acute angle with the nozzle (3) at the outlet end thereof. The second liquid flow discharged from the nozzle (4) is shown by reference character ($F_2$) and divides the deflecting chamber (6) into chamber sections (6a) and (6b). Reference numeral (8) shows a recovering passage formed in the base plate (1) at an acute angle with respect to the branch and having one end opened in the deflecting chamber (6) at a position adjacent to the branch passage (7). Reference numeral (9) is a recovering passage having an open end (9a) directed toward intersecting point (10) of the nozzle (3) and the branch passage (7). The other ends of the recovering passages (8) and (9) are connected to a manifold line (11) provided outside the base plate (1). Reference numeral (12) shows a flow receiving pipe embedded in the base plate (1) in such direction as to be longitudinally aligned with the nozzle (3). Further, reference numeral (13) shows an air intake port for introducing pulsating compressed air into the chamber section (6a) of the deflecting chamber (6), (14) an air vent port for communicating the chamber section (6b) with the atmosphere, and (15) an auxiliary recovering passage for receiving a film-like flow ($F_{22}$) and passing it into the manifold line (11). The base plate (1) having the aforementioned passages, deflecting chamber (6) and the flow receiving pipe (12) embedded therein is assembled together with a mating flat cover plate (not shown).

Operation of the aforementioned injection nozzle means will now be described. FIG. 2(A) shows the liquid flow under a condition in which no compressed air of pulse is supplied into the chamber section (6a) of the chamber (6). In this instance, a portion of the liquid introduced from the liquid supply port (5) into the passage (2) is discharged from the nozzle (3) as the first liquid flow. The remaining portion of the liquid in the passage (2) is discharged from the nozzle (4) into the deflecting chamber (6) as the second liquid flow ($F_2$). Most of the liquid in the second flow ($F_2$) is passed into the branch passage (7). The flow discharged from the branch passage (7) joins with the first liquid flow from the nozzle (3), intersecting at an acute angle therewith to form a third liquid from ($F_3$) which is deflected in accordance with the combined force of the first and the second flows toward the recovering passage (9). The third liquid flow ($F_3$) is thus received by the recovering passage (9) and passed into the manifold (11). When the liquid is of such a type that has a relatively low surface tension, such as gasoline, it may be probable that a small amount of liquid in the second liquid flow ($F_2$) discharged from said nozzle (4) flows along the side wall surfaces of the deflecting chamber (6) as film-like flows such as shown by the reference numerals ($F_{21}$) and ($F_{22}$). These flows ($F_{21}$) and ($F_{22}$) are recovered through the passage (8) and the auxiliary recovering passage (15) into the manifold line (11). Thus, it may be impossible to direct the full amount of liquid in the second flow ($F_2$) into the branch passage (7). However, the error caused by the aforemention flows ($F_{21}$) and ($F_{22}$) is negligible, since in the present invention the second flow ($F_2$) from the branch passage (7) is intersected with the first flow ($F_1$) at an acute angle to provide, based on the momentum theory, a deflection of the flow from the direction toward the flow receiving pipe (12) into the direction toward the recovering passage (9).

FIG. 2(B) shows the liquid flow under another condition in which compressed air is introduced from the air supply port (13) into the chamber section (6a) of the deflecting chamber (6). By introducing the compressed air into the chamber section (6a), the second flow ($F_2$) of the liquid discharge from the nozzle (4) into the deflecting chamber (6) is deflected under the influence of the compressed air toward the chamber section (6b) to be passed through the recovering passage (8) into the manifold (11). In this instance, it may also be possible that a small amount of the liquid in the second flow ($F_2$) flows along the side wall surfaces of the deflecting chamber (6) as film-like flows ($F_{21}'$) and ($F_{22}'$) portions of which may flow into the branch passage (7). However, the first liquid flow ($F_1$) from the nozzle (3) is not affected by such small amount of liquid flow which may exist in the branch passage (7), so that it is passed into the flow receiving pipe (12).

Thus, by introducing the pulse signal of the compressed air as shown in FIG. 3(A) into the chamber section (6a) of the deflecting chamber (6), the amount ($Q_b$) of the second flow ($F_2$) in the recovering passage (8) varies in accordance with the air pulse signal, as shown in FIG. 3(B). Similarly, the second flow ($F_2$) in the branch passage (7) also varies in inverse relation with the flow in the recovering passage (8). Therefore, the amount of the first liquid flow ($F_1$) in the flow receiving pipe (12) varies in synchronous relation with the air pulse signal as shown by ($Q_c$) in FIG. 3(C). In FIG. 3(B), the value ($Q_{b1}$) shows the amount of the portions of the flows ($F_{21}$) and ($F_{22}$) which are constantly passed into the recovering passage (8). Thus, according to the present invention, even when the liquid used in the system is of such a type that has a small surface tension, such as gasoline, the air pulse signal can be positively converted into a liquid flow pulse signal by supplying the air pulse signal to the air supply port (13) and detecting the liquid pulse at the outlet of the flow receiving pipe (12).

In the illustrated embodiment of the present invention, it is possible to use any liquid of low surface tension, such as ethyl, ethel and the like in lieu of gasoline. It is possible to modify the present invention such that the chamber section (6a) may be vented into atmosphere with the chamber section (6b) adapted to be supplied with compressed gas. In such a case, the second liquid flow ($F_2$) may be so directed that it normally flows from the nozzle (4) into the recovering passage (8) when no pressure exists in the chamber section (6b) but it may be deflected to flow into the branch passage (7) when the chamber section (6b) is subjected to the air pressure.

The injection nozzle means in accordance with the present invention may advantageously be used in a fuel supply system for internal combustion engines by arranging such that the flow receiving pipe (12) opens into the intake pipe of an engine whereby the gasoline from the liquid supply port (5) is passed through the nozzle (3) and the liquid receiving pipe (12) into an intake pipe of the engine in accordance with the air pulse supplied to the port (13) and having an frequency corresponding to the engine speed and an pulse duration corresponding to the engine load.

From the above description, it will be apparent that the present invention provides an injection nozzle means comprising means for forming a first liquid flow and a second liquid flow, a deflecting chamber adapted to receive said second liquid flow discharged therein, the second liquid flow discharged from the deflecting chamber in a direction to intersect with the first liquid flow at an acute angle, said second liquid flow in the deflecting chamber dividing the chamber into two sections, one of the sections being maintained at a constant pressure, the other of the sections being adapted to the supplied with compressed gas whereby the second liquid flow is deflected in the deflecting chamber into or out of intersection with the first liquid flow. In this arrangement, by supplying a pulsating compressed gas into said other section of the deflecting chamber, the first liquid flow alone or the combined flow of the first and the second liquid flows can be taken out as a pulse signal corresponding to the pulse signal of the compressed gas. Thus, in accordance with the present invention, it is possible to convert the pulse signal of a compressed gas directly into a pulse signal of liquid with high response speed without any intermediate convertion into another physical value. Thus, the present invention does not require any means for intermediately converting the gas pulse signal into another physical value or any movable parts, so that the injection nozzle means in accordance with the present invention can be made reliable and durable with less expensive cost. Further, in accordance with the present invention, a pulse signal of a compressed gas can be converted into a pulse signal of a liquid merely by slightly deflecting the liquid flow in a deflecting chamber, therefore a slightly compressed gas may suffice to this end. Thus, it is apparent that the injection nozzle means in accordance with the present invention is particularly suitable in an application where it is required that a pulse signal of a compressed gas is converted into a pulse signal of a liquid. When the liquid is of relatively low pressurization, a small amount of liquid in the second flow ($F_2$) discharged into the deflecting chamber may extend along wall surfaces of the deflecting chamber (6) as a film-like flow ($F_{22}$) resulting in generation of bubbles in the deflecting chamber (6) which may have undesirable effects on the second flow ($F_2$) and ultimately make the operation of the nozzle means unstable. In order to eliminate this disadvantage, the injection nozzle means in accordance with the present invention may be provided with an auxiliary recovering passage (15) for removing the film-like flow ($F_{22}$) therethrough whereby formation of bubbles in the deflecting chamber (6) can be prevented and a stable operation can be obtained. The auxiliary recovering passage (15) also serves to exhaust compressed gas from the deflecting chamber (6), so that the compressed gas is not allowed to pass through the branch passage (7) to give an adverse influence on the first flow ($F_1$). This is very important in that even when an excessive amount of compressed gas is introduced into the deflecting chamber (6), the gas does not have any adverse effect on the second flow so that the nozzle means in accordance with the present invention can provide a stable operation throughout a wide range of compressed gas pulse signal. Thus, it should be noted that the present invention has an advantageous effect in that it provides means which is particularly suitable to convert a pulse signal of a compressed gas into a pulse signal of a flow of a liquid having a low surface tension.

We claim:

1. A device for controlling which of two outlets will receive a flow of liquid, comprising:
a body having a notch defined therein;

means defining a first liquid inlet conduit in said body terminating at said notch in constriction means defining a first nozzle aimed across the notch;

means defining a second liquid inlet conduit in said body extending obliquely therein to an intersection with the first fluid inlet conduit where said first fluid inlet conduit terminates at said notch;

means defining a first liquid recovering conduit in said body in coaxial alignment with the first liquid inlet conduit and having an inlet opening disposed across said notch from the first nozzle means;

means defining a second liquid recovery conduit in said body having an inlet opening disposed across said notch from the first nozzle means besides the inlet opening of said first recovery conduit, said second liquid recovery conduit being disposed angularly between coaxial alignment with the first liquid inlet conduit and the second liquid inlet conduit, and said second liquid recovery conduit being segregated from said first liquid recovery conduit;

means defining a generally triangular enlargement in said second liquid inlet conduit upstream of the intersection of the first and second liquid inlet conduits, said enlargement having an apex thereof directed downstream and a base thereof directed and generally centered upstream so as to have two corner recesses near opposite lateral extremes of the upstream end thereof;

the second liquid inlet conduit having constriction means defining a second nozzle where the second liquid inlet conduit means intersects the base of said enlargement thereof;

a third liquid recovery conduit in said body extending from communication with said enlargement adjacent said apex on the far side thereof from said notch;

a first gas inlet conduit in said body communicating with said enlargement in one of said two corner recesses; and a second gas inlet conduit in said body communicating with said enlargement in the other of said two corner recesses;

one of said first and second gas inlet conduits being constantly communicated to a source of gas and the other being communicated to a flow of intermittent pressurized gas.

2. The device of claim 1 wherein said one of said first and second gas inlet conduits is constantly communicated to the atmosphere as said gas, and its communication with the enlargement is disposed adjacent the same side of the enlargement as that of the third liquid recovery conduit.

3. The device of claim 2 wherein said second and said third liquid recovery conduits ultimately join one another downstream of their respective communications with said notch and said enlargement in means defining a manifold, and wherein said first and said second liquid inlet conduits stem from means defining a common liquid inlet conduit communicated to a supply of gasoline as said liquid;

so that, in intervals when no pressurized gas is entering said enlargement through the other of said first and second gas inlet conduits, some of the gasoline issuing from said first nozzle is deflected in said notch by the gasoline issuing from the second liquid inlet conduit at said notch and leaves therewith through the second liquid recovery conduit and much of the remainder leaves through the third liquid recovery conduit and is recombined in said manifold and that in intervals when pressurized gas is entering said enlargement through the other of said first and second gas inlet conduits, most of the gasoline entering the enlargement through the second liquid inlet conduit is deflected by the pressurized gas and leaves the enlargement through the third liquid recovery conduit and the gasoline issuing from the first nozzle crosses the notch relatively undeflected and leaves through the first liquid recovery conduit and is thus segregated from that which left through the third liquid recovery conduit.

4. The device of claim 3 further including a fourth liquid recovery conduit in said body communicating between the manifold and the enlargement near said apex on the opposite side thereof from the communication of the third liquid recovery conduit with the enlargement for recovering minor amounts of gasoline from this region of the enlargement.

5. An apparatus for controlling a pulse of a high pressure liquid by a pulse of a low pressure gas comprising a passage 2 having a liquid supplying port 5, nozzles 3, 4 formed at both ends of said passage, the liquid fed from the port 5 being received in the passage 2 and led in two opposite directions therein, an outlet passage 12 located in coaxial relation with the passage 2 and spaced away from the nozzle 3, a passage 9 connecting with a liquid reservoir and provided near the nozzle 3, a chamber 6 connecting with the nozzle 4 which chamber is separated into two chambers 6a, 6b by a second liquid flow injected from the nozzle 4, a port 13 located in the chamber 6a for introducing a pulsating pressure air, a port 14 located in the chamber 6b for connecting it with atmosphere, a passage 7 located in coaxial alignment with the nozzle 4 and spaced away from the nozzle, the axis of the passage 7 intersecting the axis of the nozzle 3 at an acute angle, and a passage 8 connecting with the reservoir, the second liquid flow directed through the chamber 6 and the passage 7 deflecting a first liquid flow injected from the nozzle 3 towards the passage 9 and the resultant liquid flow being returned to the reservoir through the passage 9, further, when the pulsating pressure air being supplied from the port 13 into the chamber 6b, the second liquid flow being directed to the passage 8 by the differential pressure between the both chambers 6a, 6b and the first liquid flow being directed into the output passage 12.

6. An apparatus in accordance with claim 5 which comprises an auxiliary recovering passage located near the passage 7 and in the second chamber 6b for receiving a film-like flow therein and passing it into the passage 11.

* * * * *